United States Patent
Janssens

(10) Patent No.: US 9,482,877 B2
(45) Date of Patent: Nov. 1, 2016

(54) LASER PROJECTOR WITH REDUCED SPECKLE

(75) Inventor: Peter Janssens, Nazareth (BE)

(73) Assignee: Barco N.V., Kortrijk (BE)

( * ) Notice: Subject to any disclaimer, the term of this patent is extended or adjusted under 35 U.S.C. 154(b) by 270 days.

(21) Appl. No.: 14/110,807

(22) PCT Filed: Apr. 12, 2011

(86) PCT No.: PCT/EP2011/055743
§ 371 (c)(1),
(2), (4) Date: Oct. 9, 2013

(87) PCT Pub. No.: WO2012/139634
PCT Pub. Date: Oct. 18, 2012

(65) Prior Publication Data
US 2014/0028985 A1    Jan. 30, 2014

(51) Int. Cl.
*G02B 21/20*    (2006.01)
*G02B 27/48*    (2006.01)
(Continued)

(52) U.S. Cl.
CPC ........... *G02B 27/48* (2013.01); *G02B 27/0905* (2013.01); *G02B 27/0927* (2013.01);
(Continued)

(58) Field of Classification Search
CPC .. G02B 27/48; G02B 27/09; G02B 27/0905; G02B 27/0927; G02B 27/0955; G03B 21/2013; G03B 21/2033; G03B 21/206; G03B 21/208; H04N 9/31; H04N 9/3102; H04N 9/3108; H04N 9/3152; H04N 9/3161
USPC .............................. 353/38, 31, 33, 34, 37, 85
See application file for complete search history.

(56) References Cited

U.S. PATENT DOCUMENTS

| 6,577,429 B1 * | 6/2003 | Kurtz | H04N 9/3132 347/239 |
| 6,594,090 B2 * | 7/2003 | Kruschwitz | G02B 27/0927 345/88 |

(Continued)

FOREIGN PATENT DOCUMENTS

| CN | 101592786 A | 12/2009 |
| JP | 4359615 | 8/2009 |

(Continued)

OTHER PUBLICATIONS

English translation of Office Action in corresponding Chinese Patent Application No. 201180070475.2 dated May 20, 2015.

(Continued)

*Primary Examiner* — William C Dowling
(74) *Attorney, Agent, or Firm* — Renner, Otto, Boisselle and Sklar, LLP

(57) ABSTRACT

The present invention provides a light source for a projector system, and method of operating the light source as well as a projector system that provides:
i. a substantially uniform brightness across the surface of an image modulator, and
ii. at each point of the surface of the image modulator a more uniform filling of the available angular space.
Embodiments of the present invention use a laser light source for use with an image modulator, the light source emitting light with multiple wavelengths for at least one primary color and a light integrator system that for each of the wavelengths is adapted to provide:
i. a substantially uniform brightness across the surface of the image modulator, and
ii. at each point of the surface of the image modulator a more uniform filling of the available angular space.

24 Claims, 11 Drawing Sheets

(51) Int. Cl.
*H04N 9/31* (2006.01)
*G02B 27/09* (2006.01)
*G03B 21/20* (2006.01)

(52) U.S. Cl.
CPC ....... *G02B27/0955* (2013.01); *G02B 27/0994* (2013.01); *G03B 21/208* (2013.01); *G03B 21/2033* (2013.01); *H04N 9/3152* (2013.01)

(56) References Cited

U.S. PATENT DOCUMENTS

| | | | |
|---|---|---|---|
| 7,997,737 B2* | 8/2011 | Itoh | G02B 27/48 349/193 |
| 8,224,133 B2 | 7/2012 | Popovich | |
| 8,235,531 B2 | 8/2012 | Silverstein | |
| 8,905,549 B2* | 12/2014 | Utsunomiya | G02B 27/48 353/38 |
| 2003/0039036 A1 | 2/2003 | Kruschwitz et al. | |
| 2007/0058135 A1* | 3/2007 | Morikawa | H04N 9/3129 353/30 |
| 2008/0079904 A1 | 4/2008 | Bartlett | |
| 2008/0239498 A1* | 10/2008 | Reynolds | H04N 9/3129 359/618 |
| 2010/0118535 A1* | 5/2010 | Kusukame | G02B 27/48 362/259 |
| 2015/0172610 A1* | 6/2015 | Candry | G03B 21/142 353/85 |

FOREIGN PATENT DOCUMENTS

| | | |
|---|---|---|
| JP | 2011-2547 | 1/2011 |
| WO | 2008/118313 | 10/2008 |

OTHER PUBLICATIONS

English translation of Office Action in corresponding Chinese Patent Application No. 201180070475.2 dated Jan. 21, 2016.

\* cited by examiner

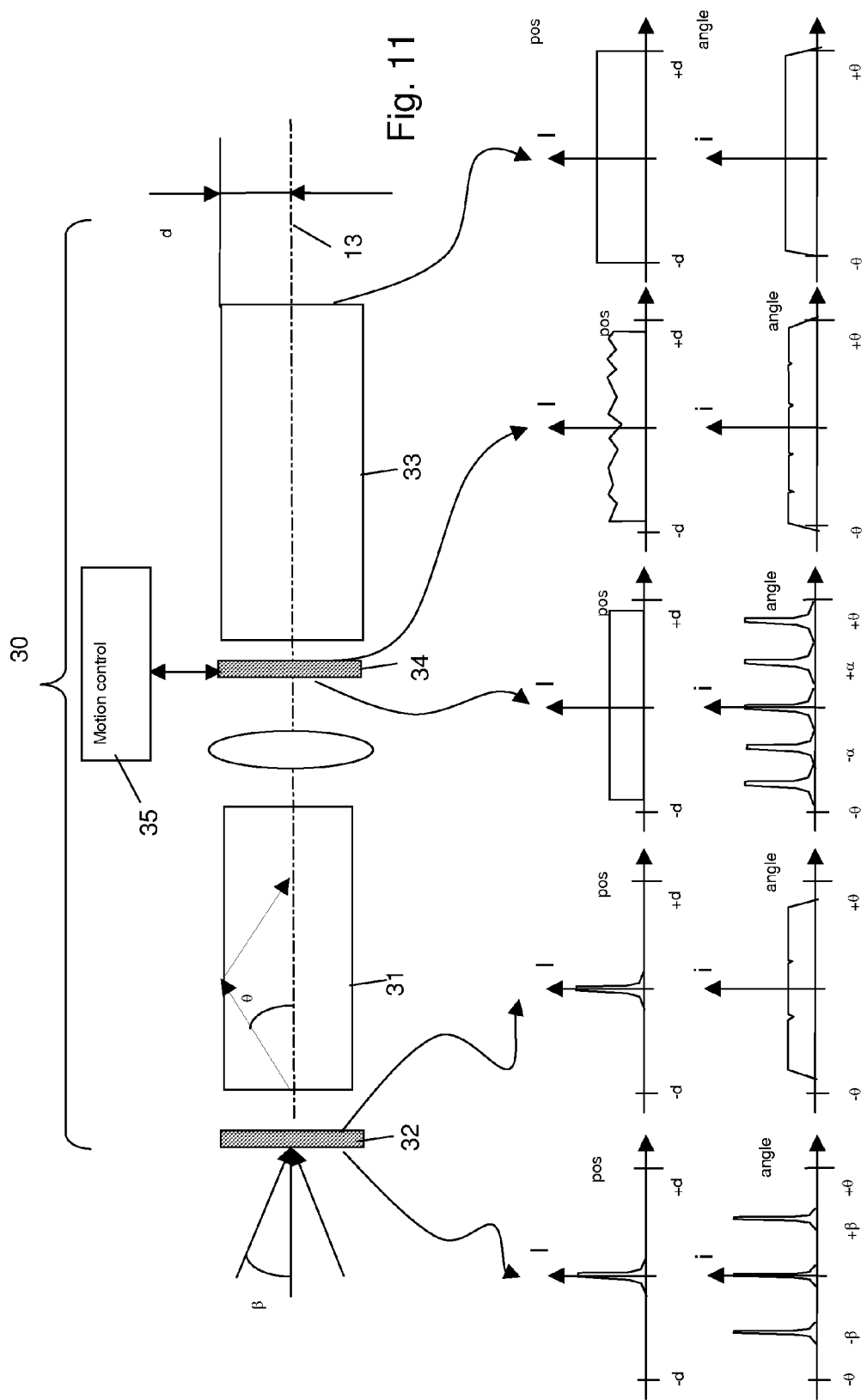

LASER PROJECTOR WITH REDUCED SPECKLE

CROSS-REFERENCE TO RELATED APPLICATIONS

This application is a §371 national stage entry of International Application No. PCT/EP2011/055743, filed Apr. 12, 2011, the entire contents of which are incorporated herein by reference.

FIELD OF THE INVENTION

This invention relates to a projector which uses a laser light source, an integrating system for such a projector and methods to reduce speckle generated by such a projector as well as to a method of using such a projector, a controller for such a projector and a method of operating such a projector.

BACKGROUND TO THE INVENTION

Projection systems require a high quality light source. While projection systems have traditionally used discharge lamps as a light source, there is now interest in alternative light sources such as lasers. Lasers have several advantageous properties. They emit a high intensity light beam and have a very long operating lifetime. However, laser light sources also have some disadvantageous properties. A laser light source emits a narrow spectrum of coherent light and projection systems with laser light sources can suffer from an effect called "speckle". Speckle is typically seen as a granular structure on the screen which deteriorates the image quality and is distracting to a viewer.

It is desirable to reduce speckle in order to obtain an acceptable image quality from a laser-based projection system.

US 2010/0165307A1 describes a laser image display system with reduced speckle. The display system comprises a laser light source and an optical integrator. The light source comprises a single red laser, a single green laser and a single blue laser. Light from the lasers is output, via a beam deflector, to an optical integrator. The optical integrator includes, part-way along its length, an element which diffuses light. This system uses time averaging of speckle patterns resulting from different amounts of deflection of the laser beam. A drawback of this approach is that different angles are generated sequentially by controlling the motion of the beam deflector. This poses a serious eye-safety risk at high projector brightness as all the light at a certain moment in time appears to originate from a single spot in the projection lens aperture. Furthermore, negative effects are likely to occur when used with certain types of light modulators that are driven by pulse width modulation (e.g. micro-mirror arrays). Aliasing effects between the PWM scheme and the beam deflector motion could occur unless both are synchronized. But if synchronized only specific deflection angles will be sampled by the light modulator and limited speckle reduction will be achieved.

US 2009/139865 proposes the combination of laser array light sources with overlapping circular Gaussian beam profile in the far field, a single integrator and a temporally optical phase shifting device. The disadvantages of this approach are the long optical path length and the precise alignment required to fulfill the overlapping far field condition.

In the book of J.W. Goodman, "Speckle phenomena in optics: theory and applications", Roberts and Company Publishers (2007), three fundamental methods are identified to reduce speckle inside the projector. Namely: angular diversity, wavelength diversity and polarization diversity.

The use of a beam deflector or optical phase shifting device both result in speckle reduction by angular diversity. However for practical high-end projection systems this approach only cannot deliver the desired level of speckle reduction. The size and acceptance angle limits of commercial light valves restrict the amount of angular diversity that can be introduced. In US 2009/139865 the combined use with polarization diversity is suggested, but it is recognized that for stereoscopic projection based on polarization this method cannot be used.

SUMMARY OF THE INVENTION

It is an object of the present invention to provide a light source for a projector system, and method of operating the light source as well as a projector system that provides:
i. a substantially uniform brightness across the surface of an image modulator, and
ii. at each point of the surface of the image modulator a more uniform filling of the available angular space.

Embodiments of the present invention use a laser light source for use with an image modulator, the light source emitting light with multiple wavelengths for at least one primary color and a light integrator system that for each of the wavelengths is adapted to provide:
i. a substantially uniform brightness across the surface of the image modulator, and
ii. at each point of the surface of the image modulator a more uniform filling of the available angular space.
These conditions are preferably met at each point in time, or if there are variations with time these occur at a frequency that is above the frequency that the human eye can distinguish.

In particular, a projector system is provided with a laser light source with multiple wavelengths for at least one primary color and a light integrator system, the light integrator system having a first and second integrator, whereby for each of the wavelengths:
the first integrator is adapted to receive light from the laser light source and to provide a substantially uniform brightness across the surface of the exit of the integrator, the light from the laser light source passing through the first integrator so that the light distribution is transformed to fill the entire cross section of the end of the first integrator, the laser light emerging from the first integrator being at a discrete number of angles with angular gaps, and the second integrator receives light from the first integrator and is adapted such that at least some of the gaps are filled.

Preferably, the entire angular space is filled. The light may experience a number of discrete reflections in the first integrator, e.g. if the first integrator is a rod.

The multiple wavelengths can be generated by multiple laser emitters or for example the multiple wavelengths can be generated by multiple laser packages.

Preferably the conditions of uniform brightness and uniform filling of the available angular space are fulfilled at each moment in time or if there are variations with time these occur at a frequency that is above the frequency that the eye can distinguish.

The image modulator may be an analog or digital modulator. The modulator can be reflective such as Digital Light Processing (DLP) or Liquid Crystal On Silicon (LCOS), transmissive such as liquid crystal panels. Individual elements of the modulator can be switched on, off or a value somewhere between on and off, depending on the amount of light that is required to be emitted, transmitted or reflected at that pixel location. When an image modulator is used that is driven by pulse width modulation preferably any such variations with time occur at a frequency that is higher then the highest modulation frequency.

In embodiments of the present invention laser light sources with multiple wavelengths for at least one primary color can separated by >0.5 and <2 nm.

In embodiments the light integrator system can be a dual integrator system using at least one diffusing element such as a diffuser or diffractive element or lenslet array or refractive prism array or a holographic element in between a first integrator element and a second integrator element.

The diffusing element such as a diffuser or a diffractive element or a lenslet array or a refractive prism array or a holographic element can be stationary or moving. The number of individual laser emitters contributing to each wavelength is preferably sufficiently high so that the diffusing element such as a diffuser or a diffractive element or a lenslet array or a refractive prism array or a holographic element can be static.

In embodiments the laser light source can emit two orthogonal polarizations for at least one primary color and the light integrator system is adapted such that for each of the polarization directions:
  i. a substantially uniform brightness is achieved across the surface of the image modulator
  ii. at each point of the surface of the image modulator 14 a substantially uniform filling of the available angular space is achieved.

Preferably the substantially uniform brightness is achieved across the surface of the image modulator and at each point of the surface of the image modulator 14 a substantially uniform filling of the available angular space is achieved at each point in time.

Further embodiments of the present invention are detailed in the attached claims.

BRIEF DESCRIPTION OF THE DRAWINGS

Embodiments of the invention will be described, by way of example only, with reference to the accompanying drawings in which:

FIG. 11 shows how the spatial uniformity and angular uniformity optionally evolve between the different stages with two integrator elements according to an embodiment of the invention;

DESCRIPTION OF PREFERRED EMBODIMENTS

Figure 1:
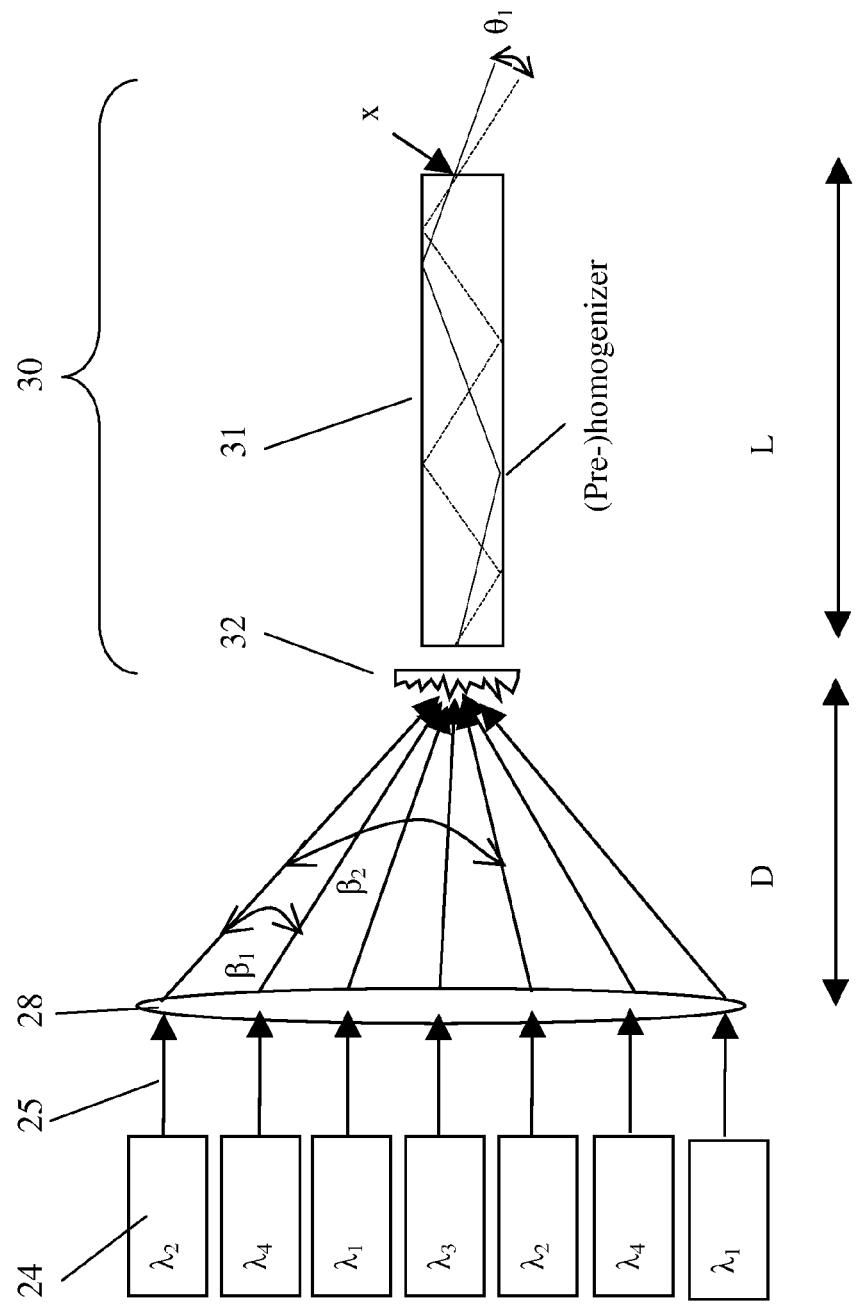
FIG. 1 shows a light source apparatus comprising a combination of an array of laser modules of the same primary colour with a number of different wavelengths according to an embodiment of the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

With reference to embodiments of the invention an example of a light source apparatus will be described with reference to FIG. 1. Light sources 24 direct light beams 25, e.g. through a lens 28 to an integrator assembly 30 that comprises an integrating element 31 and a light diffusing element 32. Integrating element 31 will be called a (pre-) homogenizer, as it provides a substantially homogeneous light spot with a desired shape (e.g. the shape of the image modulator). Once light enters an integrating element such as a rod or pipe 31, it remains within the bounds of the pipe due to reflection off the longitudinal walls of the rod or pipe. The different wavelengths indicate different wavelengths for the same primary colour. Different primary colours can be combined using dichroic mirrors.

A plurality of wavelengths $\lambda_1, \lambda_2, \lambda_3, \lambda_4 \ldots$ are output by a light source. The different wavelengths $\lambda_1, \lambda_2, \lambda_3, \lambda_4 \ldots$ are delivered from different laser packages. For example, each package can include an array of emitters, but those emitters will substantially deliver laser light at the same wavelength. Beam combination optics 28 (e.g. lens) brings the bundles of light together as closely as possible. Beams can be focused into the same point (e.g. at a first diffuser element 32) but then there will be an angular separation. The smallest angular separation between two laser packages is $\beta_1$. Between packages of the same wavelength (e.g. $\lambda_1$) the angular separation is larger $-\beta_2$. If we consider a point x at the exit of the homogenizer 31, then the light from the focus point at the entrance of the homogenizer 31 will reach point x after a discrete number of reflections. As a result the light rays at point x will have an angular separation $\theta_1$. All of the different wavelengths can be represented at these discrete angles provided that the diffuser element 32 at the entrance of the homogenizer 31 provides sufficient angular spread to generate the corresponding incoming angles for every wavelength.

It is possible to achieve speckle reduction with a single diffuser 32 and a single integrator rod 31. However, the length L of the rod 31 would need to be very long to guarantee that the angular separation $\theta_1$ is small enough to generate an angular separation at the screen that is smaller then the minimum separation required to maximise speckle reduction through angular diversity. Note that there is a fixed magnification factor between the angular separation at the exit of the rod and the angular separation at the projection screen determined by the projector optics and the projection lens.

If all the lasers in the array are of the same wavelength then it would be sufficient if the diffuser can bridge the angular gap $\beta_1$, but if different wavelengths are used then the diffuser would need to be strong enough to bridge at least the angular gap $\beta_2$. It then becomes impossible to define a diffuser such that every wavelength completely fills the available angular space of the projector's optical system and not spill any light outside this angular space. Hence a compromise has to be made between maximizing despeckling and maximizing optical efficiency. These effects can be minimized if the distance D is increased, but this increases the path length of the optical system and makes alignment much more critical.

If the light spot at the entrance of the integrator rod 31 is not a point source but instead covers a substantial part of surface, then the angular gap $\theta_1$ will be reduced. Light rays at different entrance positions will reach point x at slightly different angles after a discrete number of reflections.

Figure 2A:
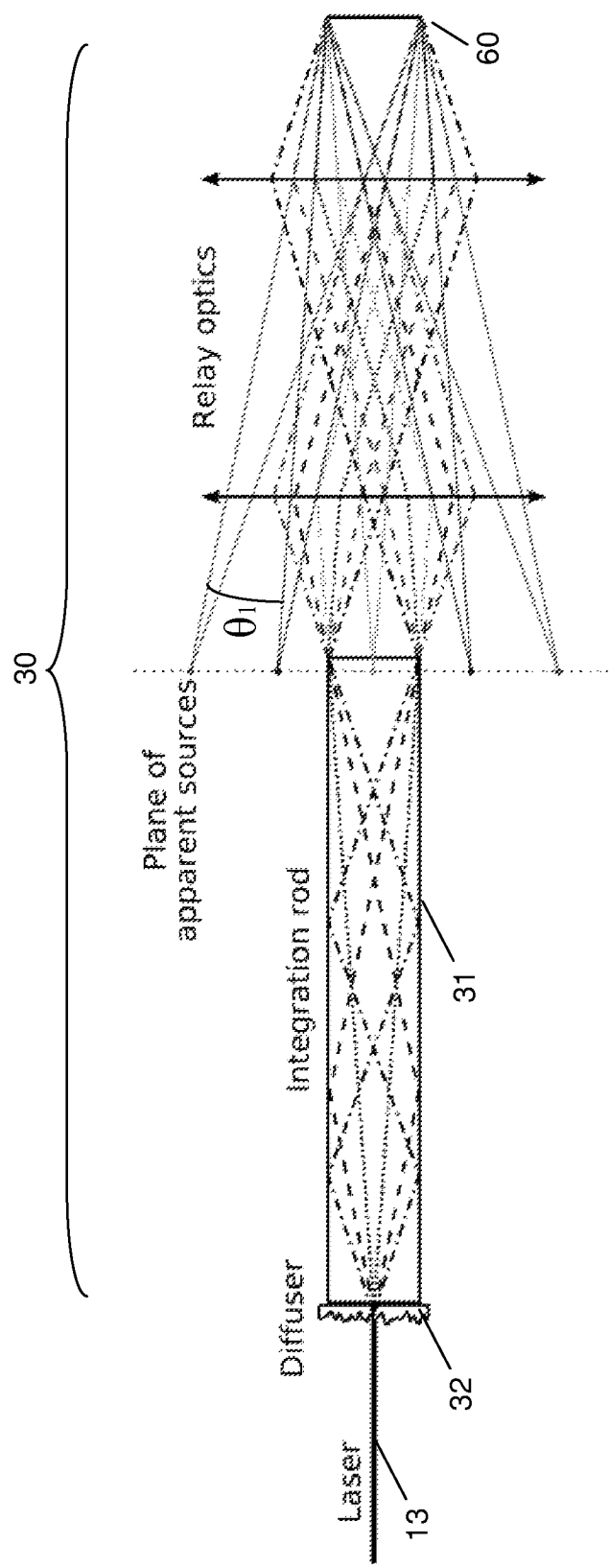
FIG. 2a illustrates the shortcomings of a single integrator setup.
Figure 2B:
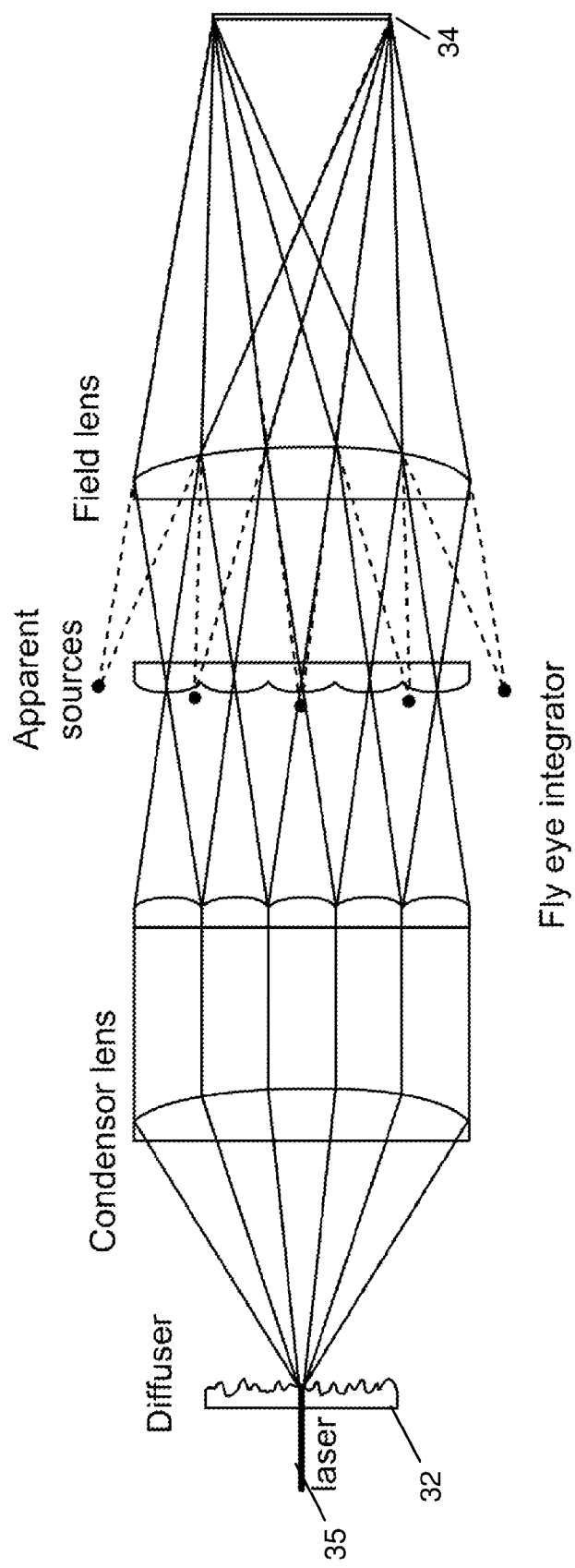
FIG. 2b illustrates an embodiment of the present invention using a fly-eye integrator.

FIGS. 2a and 2b illustrate how the shortcomings of a single integrator setup can be overcome by embodiments of the present invention. If the exit of the integrator 31 were to be imaged onto the light modulator (e.g. as shown as 60), the light would appear to be originating from a number of apparent sources arranged in a virtual plane. If the element 60 of FIG. 2a is a light modulator, and if we look at a certain point of the light modulator only a discrete number or light rays are illuminating the light modulator and there are angular gaps between those light rays. The longer the integrator rod, the more apparent sources will be present in this virtual plane and the closer the angular gaps will become.

Embodiments of the present invention provide solutions to the problems mentioned above. In accordance with embodiments of the present invention a second integrating element is placed after the first integrator 31. For example as shown in FIG. 2a the output of the first integrator 31 is directed to the element 60 which in embodiments of the present invention is a second diffuser and from there to a second integrator. FIG. 2b illustrates an embodiment of the present invention using a fly eye integrator in which the laser beam enters a first diffuser 32 and then through a fly-eye integrator to a second diffuser 34 and from there to a further integrating element such as a rod or light pipe or a further fly-eye integrator. Hence the present invention includes a two-stage integrating system whereby each integrator element can be any of a rod, a light pipe and a fly-eye integrator. When a single fly-eye integrator system is used, similar considerations concerning the existence of a discrete number of apparent sources in a virtual plane and angular gaps between the light rays illuminating a certain point of the light modulator can be made.

In accordance with embodiments of the present invention when different wavelengths are used then the diffuser element such as a diffuser or a diffractive element or a lenslet array or a refractive prism array or a holographic element provides sufficient angular spread to bridge at least the angular gap $\beta_2$ shown in FIG. 1.

Figure 3:
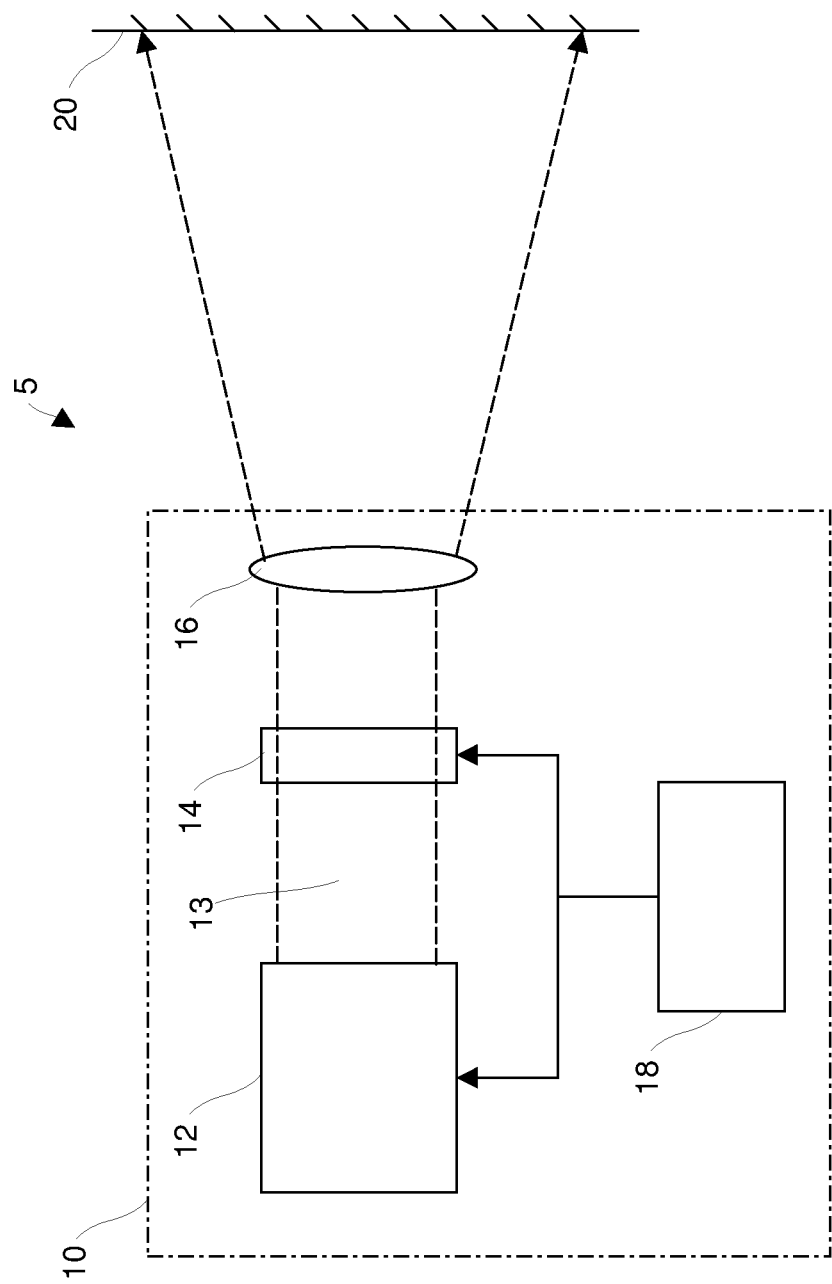
FIG. 3 shows a projection system.

FIG. 3 schematically shows a projection system 5 with which the present invention can be used, comprising a projector 10 and a display surface 20 on which an image is formed. The display surface can be a display screen or some other surface such as a face of a building or water. The projector 10 can be any suitable projector. For example it can comprise a light source apparatus 12, a light modulator 14 and a projection lens assembly 16. The light source apparatus 12 generates a beam 13 of light to illuminate the light modulator 14. The light modulator 14 can be a spatial light modulator or light valve, e.g. it can comprise a two-dimensional array of light modulating elements, also called light valve elements. Each light valve element can correspond to a pixel of the image to be displayed and can be individually controlled to allow an amount of light to pass through/be reflected from that element. In such a spatial light modulator each light valve element can correspond to more than one pixel of the image to be displayed. For example the light modulator can be controlled e.g. by oscillating rotation to allow an amount of light to pass through/be reflected from a pixel element towards a first and a second direction, e.g. to project a pixel in one half of an image and in the other half at different times. Typically, each light valve element is controlled across a range of intensity values (e.g. 256) between 'on' and 'off' to provide a range of greyscale values. Such control can include Pulse Width Modulation. The light modulator 14 can use a transmissive technology, such as liquid crystal panels, in which individual elements are switched on, off or a value somewhere between on and off, depending on the amount of light that is required to be transmitted at that pixel location. Alternatively, the light modulator 14 can use a reflective technology such as Digital Light Processing (DLP) or Liquid Crystal On Silicon (LCOS).

Advantageously, the light beam 13 has an even intensity distribution across the surface of the light modulator 14. The present invention is particularly useful with coherent light beams such as those obtained from lasers. In embodiments of this invention, the light source 12 comprises at least one laser light source capable of emitting high-intensity beams of one or more primary colours or a set of laser light sources which are capable of emitting high-intensity beams of one or more primary colours. Certain light sources 12 will be described in detail below.

The projector also comprises a controller 18 which controls operation of the light source 12 and light modulator 14. The controller may be supplied as a separate component.

The projector can comprise three or more sets of the apparatus 10 arranged in parallel—one set for each of the primary colours (e.g. red, green, blue or more), or the same set of apparatus 10 can be used to sequentially emit each of the primary colours, i.e. red, then green, then blue or more. To obtain special effects or to provide extended colour gamuts more primary colours can be used. The number of primary colours may be three, four, five or more.

In embodiments multi-chip and single chip implementations are provided. In a multi-chip implementation, parts can be common and parts can be per primary. Useful combinations are, for example:

Three or more laser light sources, one integrator, one modulator and the primary colours are projected in time sequence, Three or more laser light sources, three or more integrators, three or more modulators, Three or more laser light sources, one integrator, three or more modulators.

For example, in a preferred embodiment of the present invention a three chip architecture is provided, where all lasers are combined into a white beam, and where homogenization is done for all colors at the same time. In this case a color splitter and combiner is used to split the light to three different chips and to recombine the three single-color images into one three-color image.

In accordance with embodiments of the present invention speckle reduction happens within a single primary as the reduction or elimination of speckle needs to be done by averaging uncorrelated speckle patterns for each primary colour.

Figure 4:
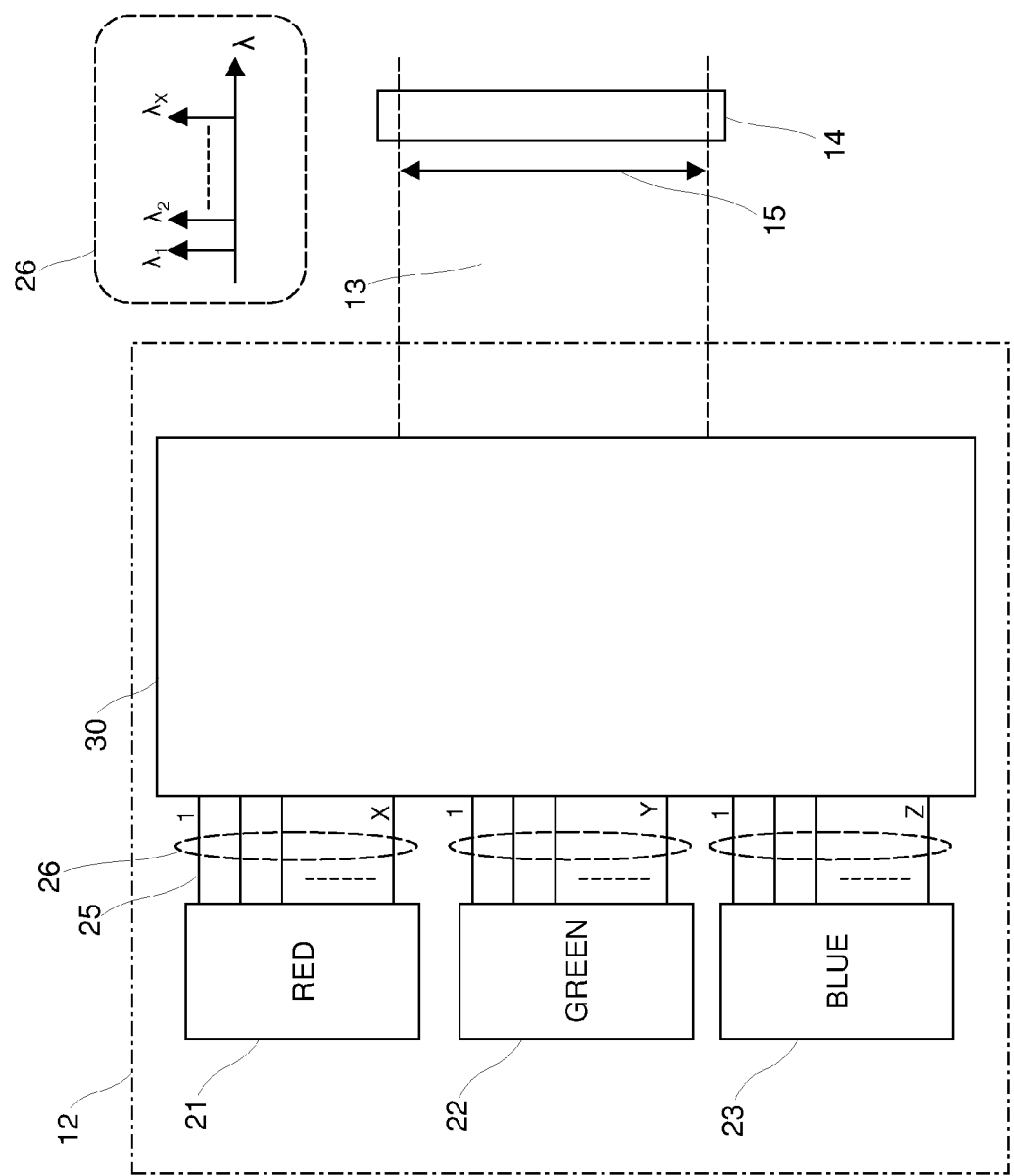
FIG. 4 shows detail of a laser light source for such a projection system using at least one laser for a primary colour or an array of lasers for each primary colour.

FIG. 4 schematically shows a light source apparatus 12. In one embodiment, for example all three or more primary colors can be combined in a single integrator. For example they can be combined using dichroic mirrors, such that the beams are overlaid and not next to each other. In another embodiment one integrator per color can be used. The light source apparatus 12 provides three or more primary colours. In at least some embodiments, there is a plurality of laser light wavelengths for each primary colour. For each primary colour, the plurality of wavelengths are offset in wavelength from one another. FIG. 4 shows a laser light source 21 for one primary colour (red) emitting X separate wavelengths in the red band; a laser light source 22 for another primary colour (green) emitting Y separate wavelengths in the green band, and a laser light source 23 for another primary colour (blue) emitting Z separate wavelengths in the blue band. For example X relatively narrow wavelength ranges e.g. <1 nm can be provided see also FIG. 5. The separation between the different wavelengths is preferably not smaller than the width of the spectrum of one laser and not smaller than 0.5 nm in case of a very narrow spectral width per laser. The values of integers X, Y and Z can be equal, but do not have to be equal. Inset 26 shows how the set of X wavelengths are offset in the red band.

Although each wavelength is shown as a single vertical line it will, in reality, have a certain spectral distribution around the central wavelength. A primary light source 21, 22, 23 is schematically shown as a single box in FIG. 4. Each light source 21, 22, 23 can comprise a plurality of laser packages. The packages can be arranged in an array. Each package can emit light at one of the wavelengths (e.g. $\lambda_1$). Each package can emit multiple beams at the same wavelength, to increase light intensity. To further increase light intensity multiple packages of the same wavelength can be added. To maximize the despeckle effect the optical power for the different wavelengths is preferably substantially equal.

The light source apparatus 12 is arranged to generate a plurality of uncorrelated, e.g. independent speckle patterns which when superimposed in space and/or time reduce the observed speckle. In embodiments where the light source apparatus contains multiple wavelengths for at least one primary colour, the independent speckle patterns are achieved by use of the integrator 30 such that for each of the wavelengths:

iii. a substantially uniform brightness is achieved across the surface of the image modulator 14, and
iv. at each point of the surface of the image modulator 14 a substantially uniform filling of the available angular space is achieved.

Preferably the substantially uniform brightness is achieved across the surface of the image modulator and at each point of the surface of the image modulator 14 a substantially uniform filling of the available angular space is achieved at each point in time.

Figure 6:
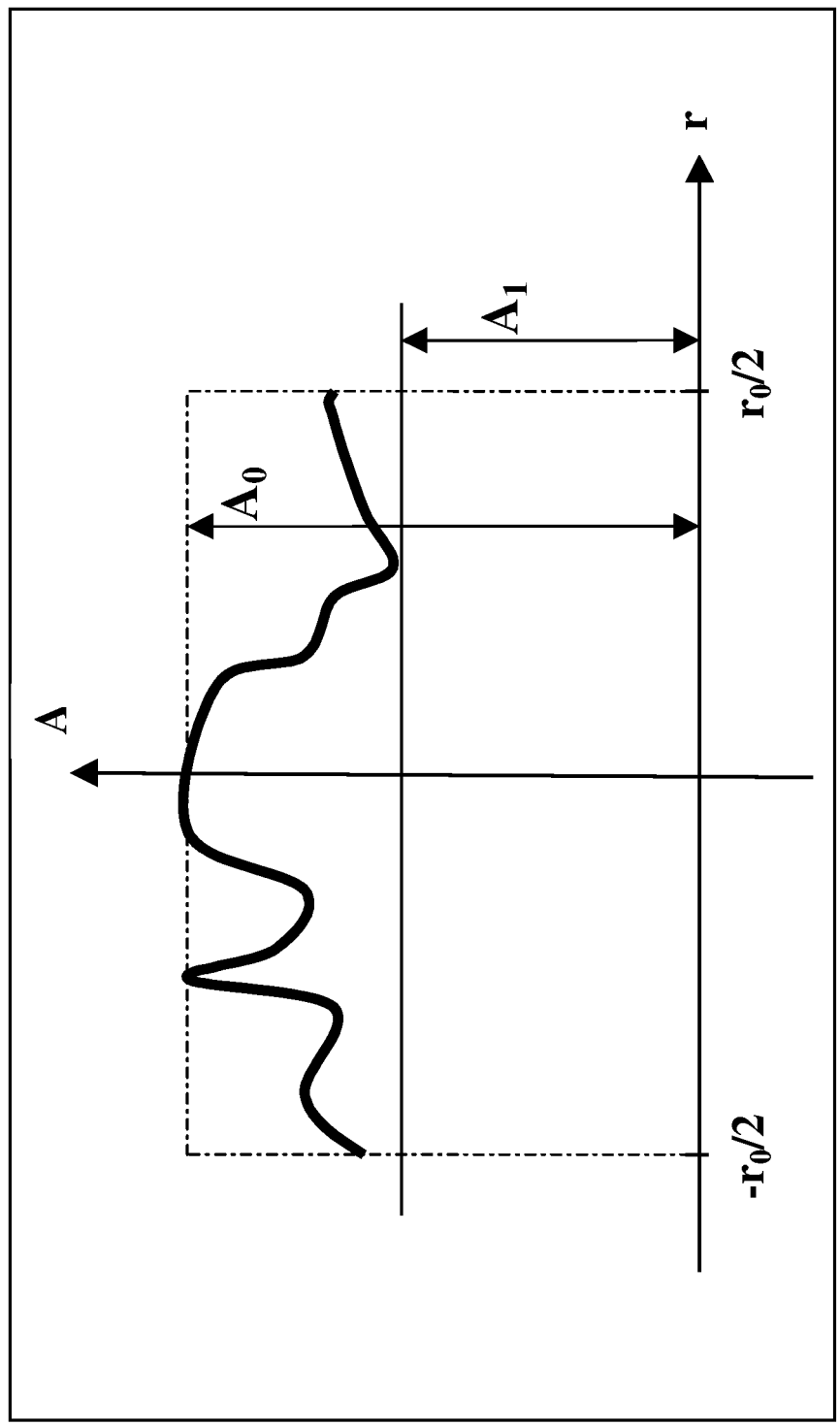
FIG. 6 illustrates how uniformity can be determined with embodiments of the present invention.

Substantial uniformity, (i.e. amplitude) can be defined by the amplitude A of light with wavelength $\lambda_i$ (see FIG. 6) which will be said to be uniform across an output surface of an integrator element such as an integration rod (in particular the pre-homogenizer) or across a light valve (DLP, LCOS ...) if the difference between its highest value $A_0$ and its lowest value $A_1$ reached by A across said surface does not exceed 30% of its highest value $A_0$ (i.e. $A_1 \geq 0.7 A_0$).

Figure 7:
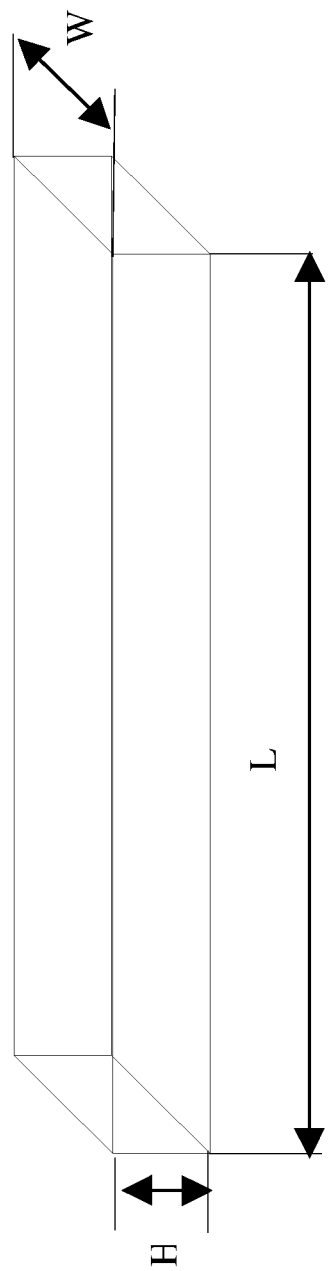
FIG. 7 illustrates the dimensions of a rod integrator.

With reference to FIG. 7 if we name W and H as the width and height of the integrator rod, (whereby if the integrator rod is tapered, W and H are taken at the exit surface), then W, H and L (length of the rod) and r are defined as follows: Substantial uniformity as defined hereabove is obtained for a sufficient ratio (r) of L/W. Preferably the ratio L/W is larger than 7.5 which allows to achieve the required uniformity. Other means may be used to improve amplitude uniformity. For instance, distributing light source with the various $\lambda_i$ as uniformly as possible at the input of the pre-homogenizer (see e.g. FIG. 8a or b for a distributed array of sources).

In case of a fly eye integrator substantial uniformity can be obtained by using a sufficiently high number of lens elements to sample the light beam. Preferably the number of lens elements sampling the light beam is larger then 45.

In some embodiments with a plurality of laser light sources for each primary colour, more independent speckle patterns are achieved by optimizing a combination of wavelength diversity and angular diversity in the integrator 30, e.g. by the use of a moving diffuser or refractive element or lenslet array or refractive prism array but in a preferred embodiment of the present invention substantially uniform filling of the available angular space is achieved with a stationary diffuser or refractive element or lenslet array or refractive prism array when a large number of incoherent laser emitters is used.

Before describing embodiments of the integrator, an overview will be given of two techniques for generating independent speckle patterns: angular diversity and wavelength diversity. A third technique—polarization diversity—can also be used in situations where polarization is not being used to separate left-eye/right-eye images in a stereoscopic projection system. Polarization diversity is described later.

Speckle reduction can be achieved by forming a plurality of mutually incoherent light sources. Each source contributes a speckle pattern and these multiple speckle patterns, when combined (averaged), result in an overall speckle pattern with reduced contrast. Two speckle patterns are independent, if, for each point, there is no correlation between the intensities of both patterns. Speckle behaves as a statistical phenomenon, which means that the speckle contrast of the sum of $N^2$ independent speckle patterns is N times lower than the speckle contrast of each of the individual speckle patterns, provided that the mean intensities of these individual speckle patterns are equal. The averaging can be achieved by the superposition of several independent speckle patterns at the same time, or by showing the independent speckle patterns sequentially within the integration time of the eye.

Angular Diversity

This technique reduces the spatial coherence of the light source. In this way, the screen is illuminated from different angles by incoherent emitters (hence angular diversity). This can be achieved by using mutually incoherent lasers (of the same wavelength) or by breaking the coherence of a single laser beam, or both at the same time. One way of achieving angular diversity is using a moving diffuser or refractive element or lenslet array or refractive prism array in the illumination system of the projector or a source with multiple incoherent lasers, but other solutions are possible.

Figure 9:
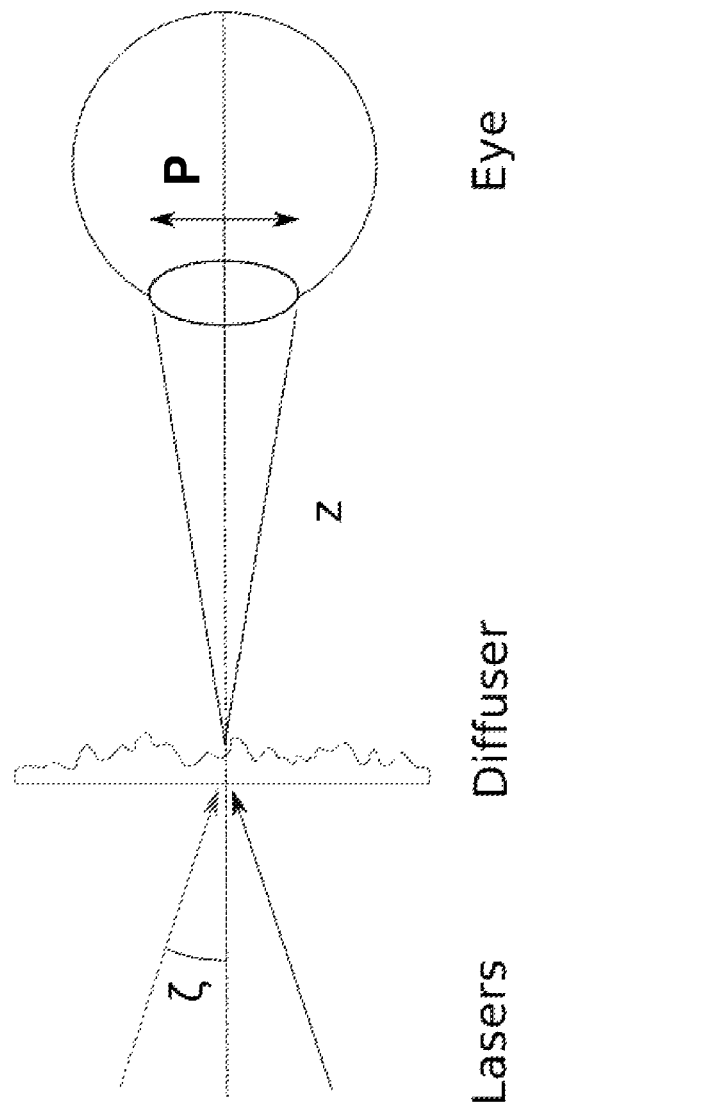
FIG. 9 illustrates angular diversity.

Speckle reduction can be achieved by using a large number of incoherent emitters. An additional condition is that the angles of incidence on the screen of all these light sources have to be sufficiently spread because otherwise the speckle patterns generated by different emitters will be correlated with each other. Theoretical calculations show that the minimum angular separation of both sources depends on the viewer and his position relative to the screen. Therefore, the angular separation of the sources should be larger than the numerical aperture of the observer as explained in the book of J.W. Goodman, "Speckle phenomena in optics: theory and applications", Roberts and Company Publishers (2007) pages 181-185. This is illustrated in FIG. 9. The speckle patterns will only be independent when they come from sufficiently different angles: $\sin \zeta \geq P/2z \approx NA_{image}$. $NA_{image}$ is the numerical aperture of the pupil of the observer's eye.

To exploit angular diversity as much as possible the angles of the light arriving at the screen should be maximized. This has some implications on the design of a laser projector. The aperture of the projection lens limits the angular space which is available for the speckle suppression and the numerical aperture of the viewer is determined by the distance between the viewer and the screen, which is a fixed parameter depending on the application. The maximum reduction of the speckle contrast is determined by the amount of times the numerical aperture of the viewer fits inside the solid angle subtended by the aperture of the projection lens. At the same time the angles on the screen are related to the angles on the light valve chip divided by the magnification provided by the projection lens, hence also this is a fixed parameter for a certain application. Thus for a fixed screen size, a fixed relative position of the viewer from the screen, a certain light valve size and maximum angle accepted by the light valve, the amount of speckle reduction that maximally can be achieved by angular diversity is fully defined.

As soon as maximum speckle reduction is obtained in a projector with one technique based on angular diversity, another technique of the same class will have no effect. Assume one has built a laser projector with a single laser emitter and by means of a moving diffuser or refractive element or lenslet array or refractive prism array in the illumination system this maximal speckle suppression is obtained. In that case, one can not further reduce subjective speckle by adding more emitters of the same wavelength.

In embodiments of the present invention speckle suppression by angular diversity is maximized within the available angular space accepted by the light modulator 14 and the projector optics (étendue of the projector) by filling this angular space uniformly or as uniformly as possible. This ensures that the angular spacing between different angular components is small enough to guarantee that $\zeta$ for the relevant viewer positions is equal to or smaller then the above mentioned minimum separation condition.

Wavelength Diversity

This technique suppresses speckle by using a source with a wide spectrum. The speckle patterns of two monochromatic light sources of a different wavelength ($\lambda-\Delta\lambda/2$ and $\lambda+\Delta\lambda/2$) will be different, which reduces speckle. However, there exists a lower limit for $\Delta\lambda$ to obtain independent speckle patterns as explained in the book of J.W. Goodman, "Speckle phenomena in optics: theory and applications", Roberts and Company Publishers (2007) pages 153-160. The minimal separation $\Delta\lambda$min depends on $\lambda^2$ and the surface height fluctuation ah of the screen: $\Delta\lambda\text{min}=\lambda^2/(2\pi\sqrt{2}\sigma_h)$. $\Delta\lambda$min depends on the type of screen, with $\Delta\lambda$min increasing for longer wavelengths.

In the case of direct diodes, the laser emits visible light, such that the laser light can directly be used for projection applications. These lasers are currently available in high power and efficiency for blue (<488 nm) and red (>630 nm). In the case of direct diode the spectrum from one laser is already relatively broad.

Direct lasing has also been achieved in green (around 530 nm), however, these lasers are currently still have limited output power and efficiency. In embodiments of the present invention frequency doubled lasers for green can be used. In a frequency doubled laser the light from a laser is converted to light having double the frequency (or half the wavelength) of the original lasers. The frequency doubling is a non-linear optical process, which requires high peak intensities of a single mode. This means that the typical spectrum of a frequency converted laser is very narrow. Two types of frequency doubled lasers can be considered, for example: diode pumped solid state lasers, where the gain medium is a crystal; and semiconductor lasers, where the gain medium is an electrically or optically pumped semiconductor layer structure.

The first type of frequency doubled lasers is the group of Nd-doped crystal lasers (e.g. Nd:YAG), which are lasing at IR-frequencies. A Nd:YAG laser can only lase at some limited wavelengths of which 946 nm and 1064 nm can be used to build visible lasers. These wavelengths can be converted into 473 nm and 532 nm, respectively. Other possibilities for e.g. green are the 1064 nm of Nd:YVO4 and 1047 nm or 1054 nm of Nd:YLF. As only these well-defined wavelengths can be generated, wavelength diversity is limited.

A second type is formed by IR-semiconductor lasers, which are then doubled into visible light. Although each of these lasers has a very narrow spectrum of the order of 0.1 nm in width, it is technically possible to engineer these lasers such that the central wavelength of one laser relative to the other is shifted as described in U.S. Pat. No. 6,975,294 which is incorporated herein by reference.

Figure 5:
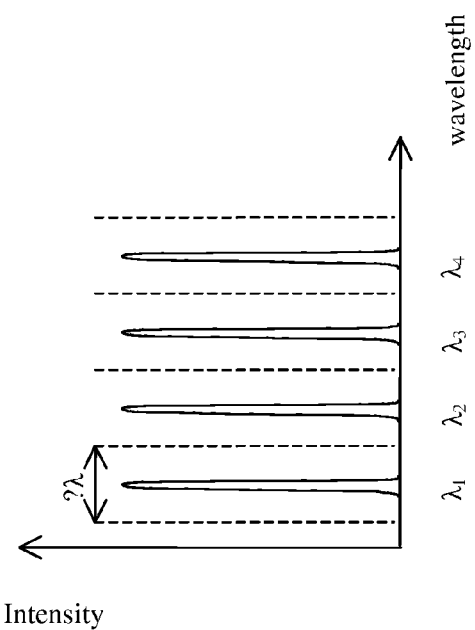
FIG. 5 shows the division of the spectrum into areas with minimal wavelength separation Δλmin and a typical spectral distribution obtained from a plurality of lasers operating at wavelengths with such minimal separation.

FIG. 5 shows that speckle reduction can be improved by using multiple lasers having different central wavelengths if the difference between the central wavelengths is larger than $\Delta\lambda_{min}$. In FIG. 5 the dotted lines indicate the minimal separation $\Delta\lambda_{min}$, whereas the solid lines indicate the shape of the spectrum of each of the laser spectra.

The parameter $\Delta\lambda_{min}$ depends on the properties of the screen. Based on experiments on a number of typical screens it has been found that spacing of adjacent wavelengths should advantageously be in the range between 0.5 and 2 nm, but it can be larger than 2 nm too. As soon as the laser spacing equals this value $\Delta\lambda_{min}$ speckle reduction by wavelength diversity will be obtained. Two lasers having a much wider spread will also result in the same speckle contrast, but it is not easy to obtain a spread>6 nm with the current semi-conductor technologies for green, and secondly a too wide spread will result in less saturated colors and no longer achieve the desired speckle reduction as the colour differences between the 2 wavelengths will be become perceptible and colour noise will be perceived.

Wavelength diversity is used to improve speckle reduction. It is desirable to minimize the number of discrete wavelengths, to minimize cost of the apparatus, and to facilitate the mixing between the different wavelengths.

To make optimal use of the wavelengths that can be produced using established laser diode and frequency doubling technologies and in order to maintain saturated narrow band primaries it is preferred that spacing would also not be wider then necessary.

In order to minimize the cost of the apparatus, it is desirable to minimize the number of discrete wavelengths and therefore it is also not advised to make the spacing significantly smaller then $\Delta\lambda_{min}$.

An example light source uses a set of semiconductor lasers. For the red band direct diodes are used and for the green and blue bands frequency-doubled semiconductor lasers are used. The advantage of these lasers is that it is possible to obtain a set of wavelength shifted lasers within a limited range of 6 and 4 nm respectively. An example set of wavelengths is:

Red: five lasers from 635 nm to 637 nm shifted in wavelength by modifying the temperature of the junction.

Green: 529.75 nm, 530.70 nm, 531.75 nm, 532.50 nm, 533.75 nm, 534.60 nm.

Blue: 464.20 nm, 456.25 nm, 466.20 nm, 467.20 nm

Wavelength diversity in green and blue has been achieved by tuning of a VBG and a PPLN doubling crystal. 1 nm spacing in the green band has been found to offer optimal results for most gain 1 surfaces, such as paper. As the required separation is dependent on the screen type it is optimal to tune the lasers dependent on the used screen. Where this is not possible and a tradeoff or compromise must be made. For example, the 1 nm spread between the wavelength can be used, even though a slightly larger separation might be better (e.g. 1.25 or 1.5 nm) for certain screens. For some silver screens it was found that even larger separations of up to 5 nm can be preferred.

Figure 8A:
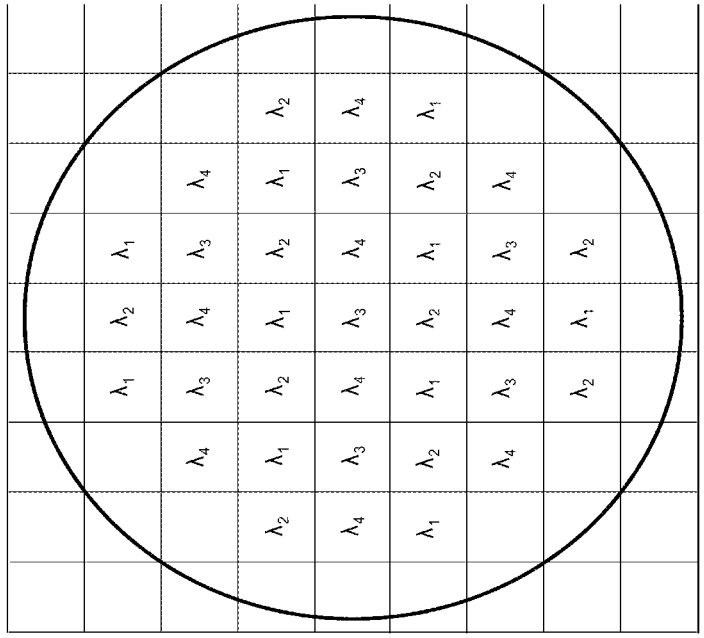
FIG. 8a shows an arrangement of laser emitters in a package according to an embodiment of the present invention.
Figure 8B:
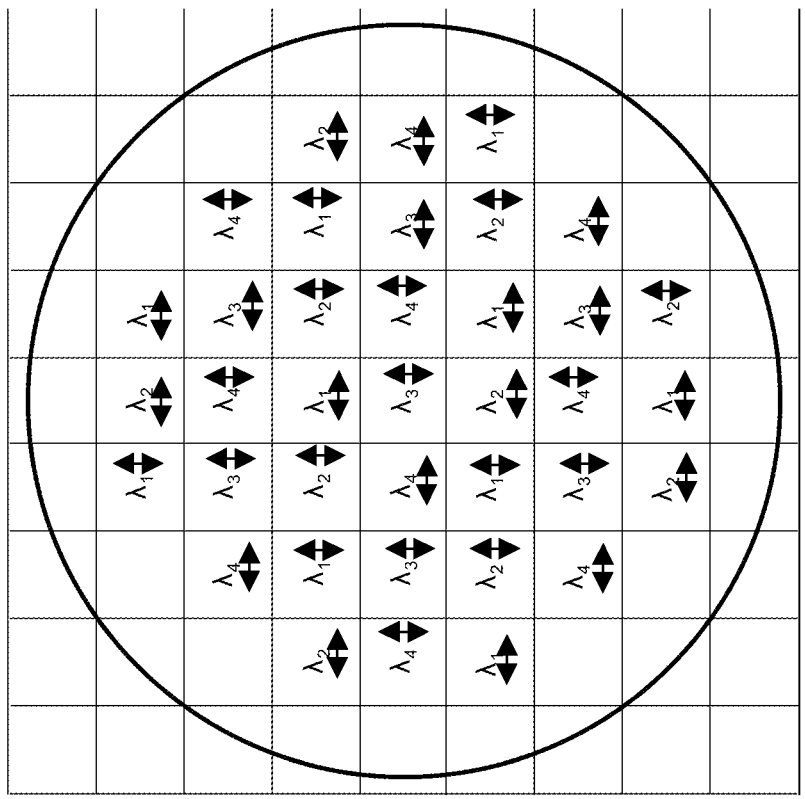
FIG. 8b shows an arrangement of laser emitters with polarizations in a package according to an embodiment of the present invention.

FIGS. 8a and b illustrate an example of how an array of 4 wavelengths for a light source producing a single primary color can be arranged. FIGS. 8a and b are a cross section of the light source in FIG. 1. The aim is that each wavelength has an equal number of sources and that their energy is well distributed across the angular space of the light source. The distribution of light sources of the different primaries is not necessarily regular. In FIG. 8a all of the sources have the same polarization. In FIG. 8b the polarizations are mixed. In both cases the mixing is irregular, and does not follow a regular pattern.

Polarisation Diversity

A further technique that can reduce speckle is polarization diversity. Interference cannot occur between two perpendicular polarization states. The scattering on many screen materials will result in a depolarization of the incoming field, which means that the reflection at a diffuse surface of a polarized laser yields two independent speckle patterns and thus a speckle reduction by $\sqrt{2}$ can be achieved. In case an unpolarized laser source is used, an additional factor $\sqrt{2}$ can be gained, resulting in speckle suppression by a factor 2. There are a few conditions that have to be fulfilled in order to achieve this factor 2. Firstly, the properties of the screen have to be such that both incident polarization states scatter in a different way on the screen. This can be caused by the fact that the scattering off one single surface is polarization dependent. In case the surface is a Lambertian scatterer, a lot of scattering takes place before the light leaves the screen. In this way it seems that there are two screens with a different surface structure (one for each polarization state). Secondly, there should not be a fixed phase-relation between the two polarization states incident on the screen. Such a fixed phase-relation can e.g. be caused by the depolarizing effect of reflecting surfaces as each reflection will cause a phase shift between the s- and p-polarization states. Although linear polarization is lost, the light is still elliptically polarized. When both conditions are completely fulfilled speckle suppression of a factor 2 can be achieved. As soon as one of the conditions is only partly fulfilled, speckle suppression by polarization diversity will be lower. This reduction factor of two in speckle is the maximum that can be achieved with polarization diversity. In case the screen maintains the polarization, speckle suppression is limited to a factor $\sqrt{2}$, for an unpolarized laser source. Similarly, speckle reduction is limited to $\sqrt{2}$ in case the source is polarized in combination with a depolarizing screen. Speckle reduction will also be limited to $\sqrt{2}$ if the two polarization states of the source are present simultaneously and are mutually correlated. The speckle patterns with the same polarization state would then add on an amplitude basis rather than on a statistical basis. Finally, no speckle suppression by polarization diversity is achieved when the screen conserves the polarization in combination with a polarized laser source. This is, in particular, the case when polarization-based 3D techniques are used.

In embodiments of the present invention, the light source apparatus 12 is arranged to use the combined effects of a plurality of different speckle-reducing techniques. In order for all three techniques to have cumulative effects, the amount of light for each wavelength and each polarization has to be uniform across the surface of the light modulator 14 and that the angular distribution at each point on the surface of the light modulator is uniform or as uniform as possible.

Wavelength and Angular Diversity Embodiment

Figure 10:
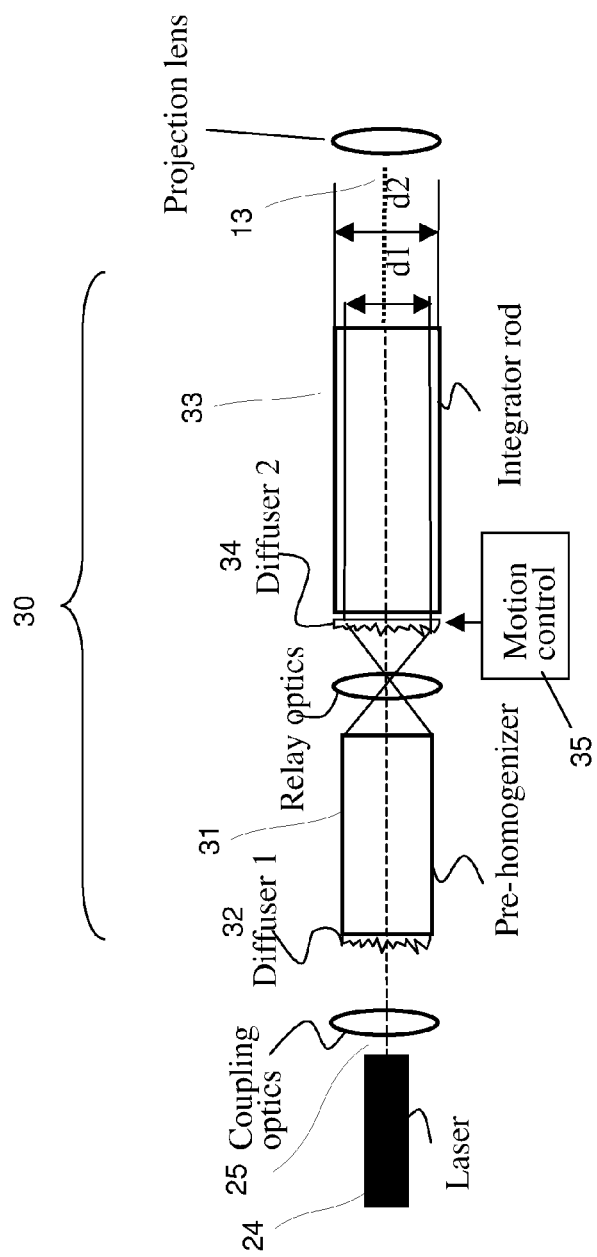
FIG. 10 shows a light source apparatus according to an embodiment of the invention with two integrator elements.

An embodiment of the present invention is shown in FIG. 10. FIG. 10 shows an integrator 30 which comprises two integrator elements 31, 33 and an intermediate or second diffuser or refractive element or lenslet array or refractive prism array 34. This will be called a "dual integrator". The integrator 30 is adapted to fill the étendue of the projector as uniformly as possible, without scattering light over larger angles, which are not accepted by the projectors optical system and projection lens (leading to reduced light efficiency). The two integrator elements 31, 33 are arranged sequentially along a lightpath between the light sources 24 and light modulator 14. The two integrators are not shown as being in physical contact with each other with relay optics in between to image the exit of integrator 31 onto the entrance of integrator 33 and diffuser element 34. However, if there are a sufficiently high number of incoherent laser emitters such that the motion control of the diffuser element 34 is no longer required, the two integrator elements 31, 33 can be arranged such that they physically connect to one another.

In an embodiment the first integrator element 31 is called a pre-homogenizer and is preceded by a first diffuser or refractive element or lenslet array or refractive prism array or lenslet array or refractive prism array 32. The first integrator element only has to ensure that every wavelength is distributed with uniform intensity across the exit surface. Angular gaps can still be accepted, and the second diffuser or refractive element or lenslet array or refractive prism array 34 will close the angular gaps for each point of the face of the entrance of the second integrator element 33. Only weak diffusers are required, minimizing light loss. The first diffuser or refractive element or lenslet array or refractive prism array 32 only has to enable spatial mixing in the pre-homogenizer 31. A fully uniform brightness and angular distribution will be achieved at the exit of the second integrator element 33. In some embodiments sufficient incoherent laser light emitters at each wavelength are provided, such that the diffuser or refractive element or lenslet array or refractive prism array 34 can be static.

When the number of incoherent laser light emitters at each wavelength is too small to maximize speckle reduction through angular diversity then the second diffuser or refractive element or lenslet array or refractive prism array 34 is enabled to move. This movement can be controlled by a movement controller 35. This will further introduce random phase differences between light rays impinging the screen at different angles. The diffusers or refractive elements 32 and 34 preferably are engineered holographic diffusers or refractive elements having a flat-top (or hat-shaped) circular diffusing profile. The advantage of using engineered diffusers is that they reduce light loss by avoiding that light is scattered over too wide angles. In order to maximize angular diversity it is advantageous that the intensity distribution across the projector's aperture is uniformly filled, such that a circular top-hat diffusing profile can be particularly interesting.

The laser beam 25 output by laser 24 is incident on a first diffuser or refractive element or lenslet array or refractive prism array 32 to increase the étendue and introduce the angles necessary to enable beam homogenization. Then the light from the lasers 24 is homogenized in a first integrator 31. In an advantageous embodiment integration rods are used. Then, the uniform output of the pre-homogenizer 31 is imaged onto a diffuser or refractive element or lenslet array or refractive prism array 34 (or a diffuser is applied to the output face of the integrator). This second diffuser or refractive element or lenslet array or refractive prism array 34 is selected to substantially bridge the angular space between the different reflected rays out of the pre-homogenizer. In the figure the integrator 31 and/or the integrator 33 has a uniform cross-section along its length. In other embodiments the integrator 31 and/or the integrator 33 can have a non-uniform cross-section along its length L, such as a tapered (frusto-conical) profile. For example, a tapering that is wider at the exit can be used for the first integrator element 31 as it will further ensure that the virtual sources are placed closer together reducing the angular gaps.

Advantageously, the image of the pre-homogenizer 31 onto diffuser or refractive element or lenslet array or refractive prism array 34 matches the dimensions of the main integrator 33 or is slightly smaller to avoid light loss. In the case of a stacked set of integration rods, the size of the first rod 31 can for example be slightly smaller than the second integration rod 33 or vice versa. When the first rod 31 is a solid integration rod and the second a hollow light pipe 33, the first one fits into the second or vice versa.

Diffuser element 34 is placed as close as possible near the entrance of the second integrator, again in order to minimize light loss In preferred embodiments of the present invention diffusive element 32 is stationary, while diffusive element 34 can either be stationary or moveable to introduce random phase variations between light incident at different positions on the diffusive element. Advantageously, such a movement is in the plane perpendicular to the longitudinal axis 13 or laser beam and can be controlled by a movement controller 35.

Advantageously, the diffusing surfaces of diffusers or refractive elements 32, 34 are selected such that the resulting angular distribution and intensity is uniform (W/sr) over substantially the complete étendue of the projector. Engineered diffusers, lenslet arrays, prism arrays or other refracting or diffracting components can be used. Less uniform distributions can also result in a satisfactory speckle suppression.

The two integrator elements 31, 33 preferably have a different form or ratio r, In embodiments of the present invention use can be made of a prehomogenizer which is tapered, while the second integrator is a straight rod. When the form and ratio r of the integrators 32 and 33 are identical the light diffusing properties of the diffusive element 34 have to be selected to avoid imaging the entrance of integrator 32 onto the exit of integrator 33.

Referring to FIGS. 10 and 11, with a static diffuser or refractive element or lenslet array or refractive prism array 34 and a single laser beam, at the entrance of the optical integrator there will be a small spot from which light emits in a continuous range of angles+/−θ. Through a number of discrete reflections in the first part of the optical integrator, that light distribution will be transformed to fill the entire cross section of the integrator at the position of diffuser or refractive element or lenslet array or refractive prism array 34, the light energy will be substantially equalized across this cross-section, the angles will still be in between +/−θ. However, at any selected position light will be incident only at a discrete number of angles (e.g. in the case of a rod integrator defined by the number of reflections and the size of the light spot at the entrance). For a limited length of the integrator rod this number of discrete angles will be rather limited. By the diffuse operation of the diffuser or refractive element or lenslet array or refractive prism array 34, these gaps can be filled and the entire angular space filled. However, since all light rays are originated by a single laser source, rays at different angles have a fixed phase relationship.

FIG. 11 shows an embodiment of the integrator assembly 30. The integrator assembly comprises or consists of integrator elements 31 and 33 with imaging optics in between to image the exit of the pre-homogenizer 31 onto the entrance of homogenizer 33. A diffuser is preferably positioned in front of any one or each integrator element. For example a second diffuser 34 can be optionally movable, the first diffuser 32 can be static.

In the bottom of FIG. 11 there are 2 graphs shown for different positions along the integrator assembly 30. In the top graph it is illustrated how the light intensity is distributed across the cross section of the integrator assembly, while the lower graphs show the angular distribution of the light in the center point of the intersection. The top graph shows the light intensity I representing the total energy averaged over the different angles in between positions −d and +d across the cross section of the integrator assembly. The bottom graph shows the light intensity I in a very specific angular direction for angles between +θ and −θ. Where the angles+/−θ represent the limiting angular acceptance angles of the projectors optical system. This angle θ is determined by the étendue accepted by the light modulator or light valve. The angle θ can be kept smaller than required by the light modulator or light valve to improve the optical design e.g. in terms of contrast ratio.

At the entrance of the integrator assembly a number of laser beams are incident, their spot size is very small and hence the intensity is concentrated in a small spot around the optical axis. Here three different laser beams are shown at an angular spacing β. More modules can be added, of the same wavelength but also of different wavelengths as is illustrated in FIG. 1, where then β1 is the angular separation between adjacent modules and β2 is the angular separation between adjacent modules of the same wavelength. All modules have to be combined however in an angular space that is smaller the +/−θ.

In absence of the first diffuser 32 the pre-homogenizer 31 would yield less homogenization when the laser beams are well collimated. The laser beam oriented along the optical axis would go straight through, the other two beams would after a discrete number of reflections exit the pre-homogenizer at a defined position and under the same angles. The first diffuser 32 will distribute the laser light across a wider range of angles such that a better homogenization takes place in the pre-homogenizer. Ideally the diffuser will substantially fill the available angular space for every wavelength. Preferably the diffuser has a top-hat distribution and a diffusing strength sufficient to fill the angular gap between laser emitters in different packages of the same wavelength. Assuming that all emitters deliver approximately the same brightness, then this is sufficient to guarantee that the full angular space is filled for each wavelength.

This means the full width half maximum angle of the diffuser is around β2. Preferably still some angular margin is left between the angular space after the first diffuser 32 and the maximum accepted angular space+/−θ. The more uniform the angular space is filled the better the despeckling will work but some non-uniformities or even small angular gaps could be tolerated, these can later be mitigated still by the second diffuser 34.

The pre-homogenizer 31 now will mix the light incident at different angles and at the exit of the pre-homogenizer 31 the intensity distribution across the cross-section is substantially uniform. However at a certain point at the exit only light rays at a discrete number of angles will be represented. The length of the pre-homogenizer 31 is determined to guarantee a good brightness uniformity across the exit cross section and this for every wavelength. The more uniform the brightness distribution, the better the despeckling that will be achieved by angular diversity.

The second diffuser 34 needs to close the angular gaps between the discrete angles that are seen at the exit of the pre-homogenizer. The second diffuser 34 can also mitigate some residual angular gaps and non-uniformities. After the second diffuser 34 the angles should span more or less the available angular space without diffusing light outside of this space (since this light would be lost). Ideally again a top-hat diffuser is used with full width half maximum angle of at least α. α is the apparent angular separation between the different sources indicated in FIG. 2b as the apparent plane of sources.

The second diffuser 34 is likely to cause some small scale brightness variations in addition to some residual brightness non-uniformities after the pre-homogenizer 31. The second homogenizer 33 will further mix the light to guarantee a high level of brightness uniformity at its exit. Since this exit is imaged onto the light modulator, the brightness uniformity here should be in line with the desired brightness uniformity of the projected imaged and therefore should typically be better then 70% on the screen. This means that at this point the brightness uniformity should be even better. The second homogenizer 33 will further translate the substantially uniform brightness profile at its entrance in a substantially uniform angular profile at its exit.

So finally the integrator system will deliver an illumination profile with uniform intensity across the cross section of its exit and with a uniform angular distribution in each point of this cross section. And this for every individual wavelength.

It is important that the light at different angles shows no coherence. Not only does this reduce the speckle that is introduced by the projection screen and viewed by an observer, it also is required not to introduce so called objective speckle. As this condition can be translated into the requirement that light at different positions at the entrance of the second homogenizer 33 should show no coherence, it is sufficient to move the first diffuser 32. Only a small speed of motion is sufficient to guarantee that the spatial phase relationship is sufficiently broken within the shortest on-period of the demodulator. Motion in the order of magnitude of the diffuser grain size is sufficient.

On the other hand, if the light impinging on the first diffuser 32 is already sufficiently incoherent between different positions, then the first diffuser 32 can be kept static. This will be the case when a high number of mutually incoherent emitters are used for each wavelength and when those are distributed evenly over the available angular space at the entrance of the integrator assembly.

The number of mutually incoherent emitters required to allow for a static first diffuser 32, depends upon the systems angular acceptance angle+/−θ, the magnification factor from the light modulator to the projection screen, the distance from the viewer to the projection screen and the projection screen characteristics. For a typical projection screen, at a viewing distance equal to the screen height and using a DLP projector with a 0.98" diagonal and 12 degrees tilt angle, a number higher then 24 emitters per wavelength was found to be sufficient to allow for a static first diffuser 32 for the case 6 wavelengths were used for the green primary.

In the discussion of FIG. 4 above X, Y and Z were different wavelength bins for red, green and blue respectively. Within a package a number of emitters are provided and further a number of packages of the same wavelength can be combined. We designate M as the total number of emitters of the same wavelength. Assuming that the M emitters all deliver approximately the same brightness, then it is no longer required that each emitter fills the complete aperture of the projection lens, but it is sufficient that the M lasers of the same wavelength bin combined substantially fill the complete aperture of the projection lens. When a sufficiently high number M of incoherent emitters are used for each wavelength, then it is no longer required that one of the diffusers or refractive elements is moving and the diffusers or refractive elements can be kept static.

Polarization Diversity Embodiment

When it is not required that the light onto the light modulator is polarized than further despeckling can be achieved by adding polarization diversity in the light source 12. For this effect to add to the previous despeckling methods, incoherent light for both polarizations should be achieved for the entire angular space of the projector étendue and this for every wavelength. Polarization diversity could be introduced before or inside the dual integrator system (e.g. at the position of the first 32 or second 34 diffusive element) In preferred embodiments of the invention it is proposed to introduce polarization diversity for every wavelength before or at the first diffuser or refractive element or lenslet array or refractive prism array 32 of the dual integrator system. This can be achieved for example by using at least two incoherent emitters with orthogonal polarizations and equal brightness for every wavelength bin. Other possibilities are to use a diffuser or refractive element or lenslet array or refractive prism array 32 at position 1 that does not preserve polarization or by introducing polarization dependent random phase modulations in the laser beams or after the first diffuser or refractive element or lenslet array or refractive prism array a time varying retarder could be used.

The invention is not limited to the embodiments described herein, which may be modified or varied without departing from the scope of the invention.

The invention claimed is:

1. A light source apparatus for use with a projector having a light modulator for receiving a plurality of light beams and for projecting the light beams towards a display, comprising:
    a laser light source with multiple wavelengths for at least one primary color arranged to output a laser light beam;

an integrator assembly comprising:
  a first integrator and a second integrator; and
  a first light diffusing element, positioned in between said first integrator and said second integrator, wherein the first light diffusing element is arranged to receive a laser light and forward a plurality of light beams at a range of angles,
the integrator assembly being adapted such that for each of the wavelengths:
  a substantially uniform brightness is achieved across the surface of an image modulator and
  at each point of the surface of the image modulator a substantially uniform filling of the available angular space is achieved.

2. The light source of claim 1, wherein the integrator assembly is adapted to provide a substantially uniform brightness across the surface of the image modulator and at each point of the surface of the image modulator a substantially uniform filling of the available angular space at each point in time.

3. The light source of claim 1, wherein the first light diffusing element is a diffuser, a lenslet array, a diffraction element, a refractive prism array or a holographic element.

4. The light source of claim 1, wherein any of the first integrator and the second integrator are a rod or a light pipe integrator.

5. The light source of claim 1, wherein any of the first integrator and the second integrator are a fly-eye integrator.

6. A light source apparatus according to claim 1, wherein the rod or light pipe integrator has a variable cross-section along its longitudinal axis.

7. A light source apparatus according to claim 4, wherein the rod or light pipe integrator has a tapered cross-section along its longitudinal axis in at least one dimension.

8. A light source apparatus according to claim 1, further comprising a second light diffusing element positioned in front of the first integrator.

9. A light source apparatus according to claim 1, wherein the first light diffusing element is movable.

10. A light source apparatus according to claim 1, wherein the first light diffusing element is static.

11. A light source apparatus according to claim 1, wherein the first integrator has a different form and/or different length to width ratio compared to the second integrator.

12. A light source apparatus according to claim 11, wherein the first integrator or the second integrator as a length to width ratio of greater than 7.5.

13. A light source apparatus according to claim 1, wherein the first integrator is tapered and the second integrator is non-tapered or vice versa.

14. A light source apparatus according to claim 1, wherein the laser light source comprises an array of light emitting devices, and wherein one of the devices outputs a light beam at one of the plurality of wavelengths.

15. A light source apparatus according to claim 14, wherein multiple devices outputting a light beam at the same wavelength are offset from one another in the array, and are optionally evenly distributed across the array.

16. A light source apparatus according to claim 1, wherein the plurality of wavelengths have an offset of less than 2 nm and optionally more than 0.5 nm from one another.

17. A light source apparatus according to claim 1, wherein a light beam has two orthogonal polarizations.

18. A light source apparatus according to claim 17, wherein the first or second diffuser element does not maintain polarization.

19. A light source apparatus according to claim 17, wherein a time varying retarder is placed after the first and/or second diffuser element.

20. A light source apparatus according to claim 1, wherein the multiple wavelengths are generated by multiple laser emitters.

21. A light source apparatus according to claim 1, wherein the multiple wavelengths are generated by multiple laser packages.

22. A light source apparatus according to claim 20, in which the number of individual laser emitters contributing to each wavelength is sufficiently high and the first and second diffusing element are static.

23. A projector comprising a light source apparatus according to claim 1.

24. A projector according to claim 23, wherein said light source apparatus is provided with two orthogonal polarizations for at least one primary color and using a light integrator system that is conceived such that for each of the polarization directions:
  v. a substantially uniform brightness is achieved across the surface of the image modulator, and
  vi. at each point of the surface of the image modulator a substantially uniform filling of the available angular space is achieved.

* * * * *